Sept. 12, 1961 F. N. MARIANI 2,999,428
MOUNTING FOR REAR VISION REFLECTOR
Filed May 31, 1955 2 Sheets-Sheet 2
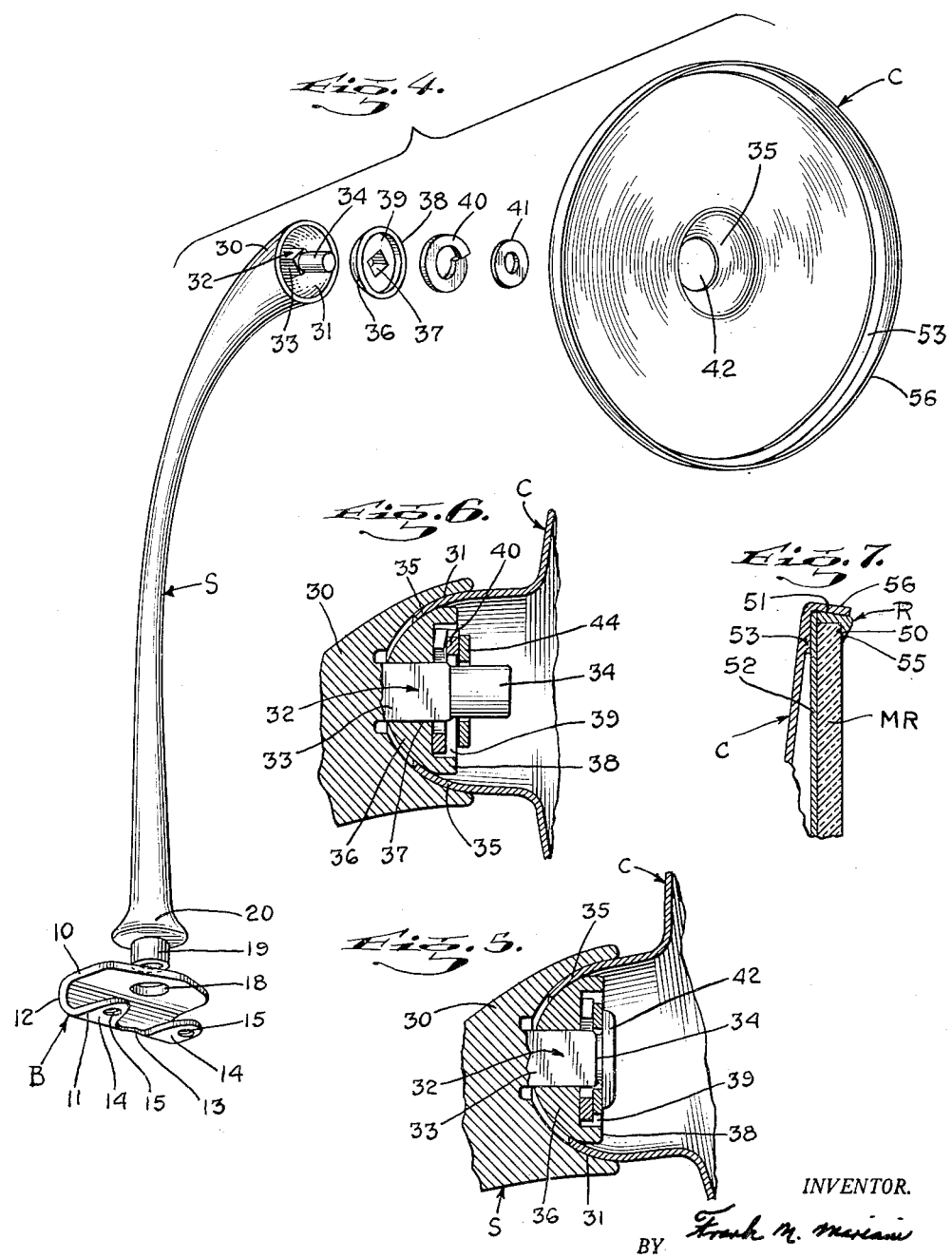
INVENTOR.
Frank N. Mariani
BY
ATTORNEY.

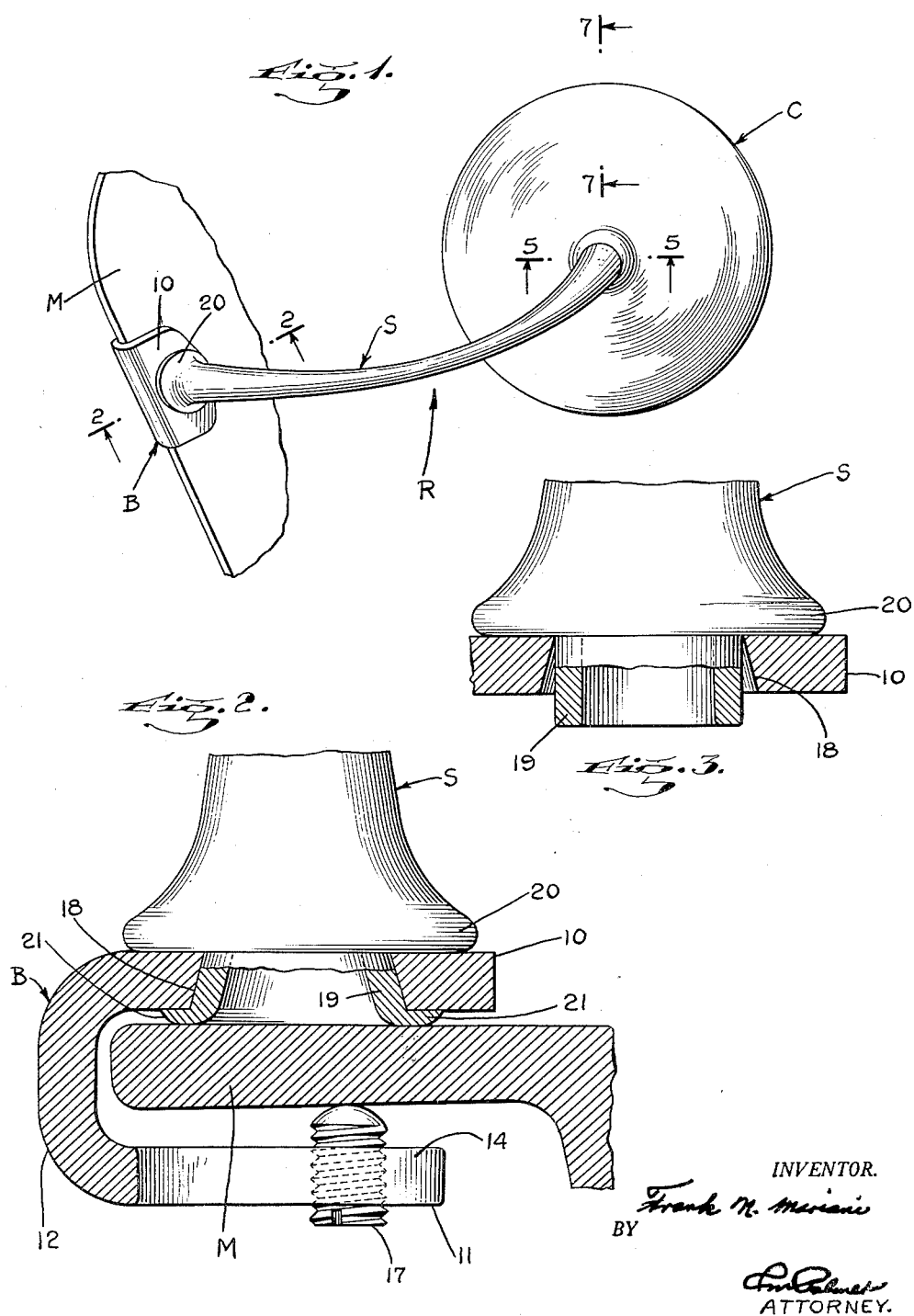

2,999,428
MOUNTING FOR REAR VISION REFLECTOR
Frank N. Mariani, 165 Seaman St., Washington
Heights, New York, N.Y.
Filed May 31, 1955, Ser. No. 511,914
2 Claims. (Cl. 88—98)

The subject matter of the invention is an improved rear vision reflector for vehicles and of the type adapted to be removably mounted on a molding thereof. One important object resides in the provision of a rear vision reflector wherein the gooseneck thereof can be conveniently adjusted while still mounted on the vehicle. Another object is realized in the provision of a rotatable gooseneck or arcuate stem appropriately carrying the reflector casing and carrying rotatable bearing means adapted to removably straddle and clamp against the molding for holding the gooseneck in a set position against accidental rotation relative to the vehicle and bearing means. Another object deals with a gooseneck having a downwardly flared base embodying a depending nipple cooperating with the bearing means for rotatably retaining the gooseneck relative to the bearing means except when the molding is clamped against the nipple. Another object is concerned with a novel and universal ball and socket connection for rotatably and frictionally retaining the reflector casing. Other objects, advantages and functional and structural features of the invention will be evident from the following detailed specification considered in the light of the accompanying drawings wherein:

FIG. 1 is a perspective view of the rear vision reflector according to my invention shown attached to a part of an automotive device.

FIG. 2 is an enlarged sectional view on the line 2—2 of FIG. 1.

FIG. 3 is a fragmentary view of FIG. 2 but showing the gooseneck and bearing in assembled relation but before the depending annular flange has been bent or spun outwardly against the bearing.

FIG. 4 is an exploded perspective view of the reflector shown in FIG. 1.

FIG. 5 is a sectional view on the line 5—5 of FIG. 1 showing the ball and socket connection in an operatively secured relation.

FIG. 6 is a view similar to FIG. 5 but illustrating the stem of the ball and socket joint prior to operatively retaining the ball to the socket, and FIG. 7 is a sectional view on the broken line 7—7 of FIG. 1, illustrating the manner of retaining the mirror to the casing.

In the drawings, the rear vision reflector is broadly denoted R and comprises the mirror carrying casing C, gooseneck or arcuate stem S, and bearing B which is in the form of a U-shaped yoke provided with spaced and substantially parallel arms 10 and 11 integrally merged by the arcuate bridge 12, thus defining a channel for the reception of marginal part M of an automotive device (not shown).

Arm 11 is cutaway to provide recess 13, hence forming spaced ears 14 each having a threaded opening 15 for adjustably receiving a threaded set screw 17.

Upper arm 10 embodies the circular tapered and downwardly expanding opening 18 for rotatably receiving the depending annular nipple or hollow flange 19 extending from the widened or flared base 20 of gooseneck S.

After nipple 19 is projected into tapered opening 18, a tool (not shown) is inserted into the bore of nipple 19, causing the latter to spread outwardly and against the wall of tapered opening 18 after which the free end of the nipple is upset or spun to form the outwardly projecting annular rim 21 to rotatably retain the flared base 20 against arm 10 of the bracket or bearing B. Nipple 19 is now tapered and is rotatably confined against the wall of opening 18 by the coaction of base 20 and retaining rim 21 which rotatably straddle leg 10.

If margin M be interposed between leg 10 and the interrupted leg 11, and screws 17 are subsequently tightened, it is apparent that margin M will bear against rim 21, and the latter against leg 10, causing leg 10 to be clamped tightly and against rotation, realtive to bearing B.

Thus bearing B need not be removed from the margin or molding M of the vehicle in the event it is desired to rotatably adjust or swivel the gooseneck relative to bearing B. As is well appreciated, this may be easily accomplished by merely unloosening set screws 17 and subsequently rotating the gooseneck relative to bearing B to the position desired after which set screws again are tightly clamped against margin M to firmly clamp rim or fiange 21 against leg or arm 10. By such action, the gooseneck is again held in a set position and against accidental rotation.

The upper part 30 of the gooseneck is also flared and characterizes a socket having the inside concaved bearing face 31 out of which stud 32 projects. The lower part 33 of stud 32 is square shaped or non-circular while its upper part 34 is reduced and cylindrical. The lower part 33 of stud 32 extends from the body of the flared portion 30 which is adapted to rotatably and tiltably receive and support the bulbous portion 35 at the rear of the mirror casing C.

Cooperating with the inside concaved surface of bulbous portion 35 is the hemispherical ball 36 having the non circular or square shaped opening 37 and the annular flange 38 defining with the body of ball 37, recess 39 for reception of the spring lock washer 40 and the flat washer 41.

Bulbous portion 35 is provided with opening 42 adapted to widely surround stud 32. Semi spherical ball 36 fits within the bulbous portion 35 whereby its square shaped opening 37 is received on the corresponding squared lower portion 33 of stud 32, thus precluding rotation of ball 36 relative to socket 30. After both washers 40 and 41 are mounted on stud 32, upper portion 34 of stud 32 is upset or spun to provide the head or flange 42 (FIG. 5) thereby holding gasket 40 and washer 41 within recess 39 and ball 36 tightly against the bulbous portion 35 for holding the latter frictionally against the inside concaved faces 31 of socket 30.

This frictional resistance may be overcome upon deliberate tilting of casing C relative to socket 30 to a desired position and this setting is retained due to the spring action of lock washer 40 which constantly urges ball 36 in a direction towards the socket or in other words a spring controlled wall and socket connection is provided permitting the mirror casing to be maintained in a set position or be swiveled and adjusted when desired to a new position.

Mirror MR is confined within recess 50 of rabetted ring R having the outside tapered frusto conical face 51. The mirror and ring are arranged against the cardboard gasket or disc 52 bearing against the annular stop corner shoulder 53 integral with and within casing C. Annular lip 55 of ring R holds the mirror in place against gasket 52. The downwardly contracted tapered annular rim 56 cooperates to hold ring R against gasket 52 and the latter against the annular corner shoulder 53.

Various changes may be made in details of construction and arrangement of parts without departing from the spirit of the invention or sacrificing any of the advantages thereof inherent therein.

I claim:
1. In a rear vision reflector adapted to be removably mounted on a marginal part of a vehicle and including a stem for supporting a mirror casing, the combination of a U-shaped bearing having spaced, substantially parallel upper and lower arms defining a gap for removably receiving said marginal part, said upper arm having an opening therein and said stem having a nipple, said nipple having a downwardly diverging flaring conical portion with an outwardly projecting rim, the nipple extending through said opening with the rim of the nipple contacting the inner surface of said upper arm, whereby the stem is mounted for rotation relative to said bearing, said lower arm having means for cooperating with said marginal part for urging the latter toward said upper arm and for urging the rim of said nipple against said upper arm to preclude accidental rotation of said stem relative to said bearing.

2. In a rear vision reflector adapted to be removably mounted on a marginal part of a vehicle and including a stem for supporting a mirror casing, the combination of a U-shaped bearing having spaced, substantially parallel upper and lower arms defining a gap for removably receiving said marginal part, said upper arm having an opening therein and said stem having a nipple, said nipple having a downwardly diverging flaring conical portion with an outwardly projecting rim, the nipple extending through said opening with the rim of the nipple contacting the inner surface of said upper arm, whereby the stem is mounted for rotation relative to said bearing, said lower arm having means, including spaced ears each carrying a set screw, for cooperating with said marginal part for urging the latter toward said upper arm and for urging the rim of said nipple against said upper arm to preclude accidental rotation of said stem relative to said bearing.

References Cited in the file of this patent

UNITED STATES PATENTS

| | | |
|---|---|---|
| 1,427,434 | Bohri | Aug. 29, 1922 |
| 1,909,526 | Falge et al. | May 16, 1933 |
| 2,338,780 | Poncher et al. | Jan. 11, 1944 |
| 2,450,179 | Anderson | Sept. 28, 1948 |
| 2,604,818 | Morgenstern | July 29, 1952 |
| 2,615,368 | McK. Bendley | Oct. 28, 1952 |
| 2,644,658 | Reed | July 7, 1953 |
| 2,671,630 | Whitehead | Mar. 9, 1954 |
| 2,704,963 | Paracheck | Mar. 29, 1955 |
| 2,706,931 | Morgenstern | Apr. 26, 1955 |
| 2,724,996 | O'Shei | Nov. 29, 1955 |